US006886269B2

(12) United States Patent
Hoffmann et al.

(10) Patent No.: US 6,886,269 B2
(45) Date of Patent: May 3, 2005

(54) LOCATING DEVICE

(75) Inventors: Erhard Hoffmann, Altenriet (DE); Stefan Clauss, Leinfelden-Echterdingen (DE); Uwe Skultety-Betz, Leinfelden-Echterdingen (DE); Bjoern Haase, Stuttgart (DE); Ulli Hoffmann, Nieffern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/466,216

(22) PCT Filed: Oct. 11, 2002

(86) PCT No.: PCT/DE02/03873

§ 371 (c)(1),
(2), (4) Date: Jul. 14, 2003

(87) PCT Pub. No.: WO03/067189

PCT Pub. Date: Aug. 14, 2003

(65) Prior Publication Data

US 2004/0068887 A1 Apr. 15, 2004

(30) Foreign Application Priority Data

Feb. 7, 2002 (DE) .......................................... 102 05 000

(51) Int. Cl.$^7$ ................................................. G01B 3/12
(52) U.S. Cl. .......................................... 33/773; 33/775
(58) Field of Search .......................... 33/772, 773, 775, 33/779, 780, 781, 782, 121, 122, 124, 533

(56) References Cited

U.S. PATENT DOCUMENTS

| 37,002 A | * | 11/1862 | Lawrence | 33/779 |
| 3,892,963 A | | 7/1975 | Hawley et al. | |
| 4,616,419 A | * | 10/1986 | Kubo | 33/122 |
| 5,107,598 A | * | 4/1992 | Woznow et al. | 33/775 |
| 5,577,330 A | * | 11/1996 | Cheng | 33/772 |
| 6,035,542 A | * | 3/2000 | Woznow et al. | 33/533 |
| 6,249,987 B1 | * | 6/2001 | Gorfu | 33/781 |

FOREIGN PATENT DOCUMENTS

| DE | 14 48 369 A | 12/1968 |
| DE | 38 36 758 A1 | 5/1989 |
| DE | 199 61 209 A1 | 6/2001 |
| GB | 2 278 444 A | 11/1994 |
| WO | 89 01604 A | 2/1989 |
| WO | 97/05447 | 2/1997 |

* cited by examiner

Primary Examiner—Christopher W. Fulton
(74) Attorney, Agent, or Firm—Michael J. Striker

(57) ABSTRACT

A positioning device includes a housing (10) and a display unit (12), in particular a display for graphic representation of measurement information, which display is movable for locating purposes using a handle unit (14) over a surface of an article being examined. The device has at least one sensor unit (20) for picking up a first motion parameter. At least one motion measuring direction (16, 18) extends transversely to the longitudinal direction (22) of the housing (10).

18 Claims, 2 Drawing Sheets

LOCATING DEVICE

BACKGROUND OF THE INVENTION

The invention is a based on a positioning device including a housing and a display unit, preferably a display for graphic representation of measurement information.

A handheld positioning device is known that has a chassis with four wheels, of which two wheels are mounted on each long side of the positioning device. The opposite wheels are each connected via an axle extending perpendicular to the longitudinal direction of the positioning device. The positioning device has a display on a top side of its housing and a handle unit, which extends in the longitudinal direction and with which the positioning device can be moved with running surfaces of the wheels over a surface of an item being examined in the direction of its longitudinal direction.

For picking up a motion parameter using a sensor unit, the two rigid axles and the sensor unit are mechanically coupled via a toothed belt.

SUMMARY OF THE INVENTION

The invention is based on a positioning device, having a housing and having a display unit, in particular a display for graphic representation of measurement information, which display is movable for locating purposes using a handle unit over a surface of an article being examined, and having at least one sensor unit for picking up a first motion parameter.

It is proposed that at least one motion measuring direction extends transversely to the longitudinal direction of the housing. The positioning device, or the housing, can move with a measurement unit far into a corner in order to locate items, and measurement can be performed up to a distance far into the corner. If the positioning device is movable in two opposed directions during one measurement or locating operation, then the positioning device can be moved into two opposite corners, making it unnecessary to turn the positioning device around. Especially advantageously, a measurement unit for locating items is embodied or disposed essentially symmetrically to a plane that is defined by a center axis of the positioning device and a normal of a top side of the positioning device. Advantageously, accessibility into corners can be attained.

If at least one measurement unit is disposed in the housing in the longitudinal direction of the housing in an end region, then the housing with its measurement unit can advantageously be moved closely along a corner.

In a further feature of the invention, it is proposed that a transverse direction of the housing is determined essentially by the width of the measurement unit. A positioning device that is especially small in size and can thus get into corners is thus attainable, and in particular a positioning device with an advantageous maximum transverse direction of less than 12 cm can be achieved.

It is also proposed that a chassis with at least one roller body, whose axle is passed into the measurement unit, is disposed on the housing. The installation space inside the measurement unit can advantageously be utilized, and additional installation space can be avoided, especially installation space in the transverse direction in front of and behind the measurement unit.

If the axle is passed into and through the measurement unit, and if the chassis has at least two roller bodies joined together via the axle in a manner fixed against relative rotation, then straight-ahead travel with high tracking stability can be achieved, especially if the roller bodies are disposed on opposite face ends of the housing.

If at least one protrusion for protecting at least one roller body is disposed on an underside of the housing, then when the housing is moved over an edge, the roller body can advantageously be prevented from catching on it and/or becoming damaged. Moreover, if the positioning device is dropped, the roller body and/or the axles are relieved by the protrusion, because when the positioning device strikes a surface below it, the protrusion comes into contact with that surface before plastic deformation of the axle and/or of the roller body can occur.

It is also proposed that at least two control elements are disposed on the housing in front of and/or behind a surface to be grasped of the handle unit in terms of the longitudinal direction of the housing. Advantageously, additional installation space for laterally disposed control elements can then be avoided.

Especially advantageously, the control elements are disposed inside a front region, pointing in the longitudinal direction, with a radius of 60 mm from a front end of the handle unit. One-hand operation is attainable, in which all the control elements required for a measurement operation are operable. If the control elements are located in a region smaller than 25 mm, then they can be especially conveniently actuated by the user.

It is furthermore proposed that the handle unit be embodied symmetrically to a plane that is defined by a longitudinal center axis and by a normal to a top side of the positioning device. Advantageously, via the handle unit, both right-handed and left-handed users can conveniently grasp the positioning device and move it using either the right or the left hand. If the handle unit is mounted at an angle to a center axis of the housing extending in the longitudinal direction, then convenience for certain target groups of users can be enhanced, and if the handle unit is supported pivotably about a vertical axis extending through the center axis, then convenience for all the target groups can be enhanced.

Advantageously, the handle unit has a cross-sectional area that tapers in the direction of a top side of the housing and in particular is diamond-shaped. An advantageously ergonomically shaped handle unit is attainable, by way of which the user can move the positioning device over the surface of the item being examined with little fatigue.

In a further feature of the invention, it is proposed that not only the first motion parameter but at least also a second motion parameter can be detected with the sensor unit.

Advantageously, additional information can be acquired, such as information pertaining to a spacing of the housing from the surface of the item being examined and/or information pertaining to a motion of the housing along a curved path, and so forth. The measurement results can be corrected with the additional information, and measurement errors can advantageously be at least reduced. Moreover, measurement errors, especially errors caused by unintentional change in a motion measuring direction, can be displayed on a display and corrected manually and/or automatically via actuators. In addition, if the sensor unit should fail, with regard to detecting the first motion parameter, an at least partly usable measurement result can be attained with the second motion parameter, especially if the second motion parameter corresponds in terms of type to the first motion parameter.

If from the motion parameters detected, a parameter for a rotary motion of the housing about at least one axis can be ascertained, then it is simple to draw a conclusion about an unwanted motion of the housing, especially if the axis extends in the direction of the normal to the surface of the item being examined.

BRIEF DESCRIPTION OF THE DRAWINGS

Further advantages will become apparent from the ensuing drawing description. In the drawing, one exemplary embodiment of the invention is shown. The drawing, description and claims include numerous characteristics in combination. One skilled in the art will expediently consider the characteristics individually as well and put them together to make useful further combinations.

Shown are.

DETAILED DESCRIPTION OF THE PREFERRED EMBODIMENTS

Figure 1:
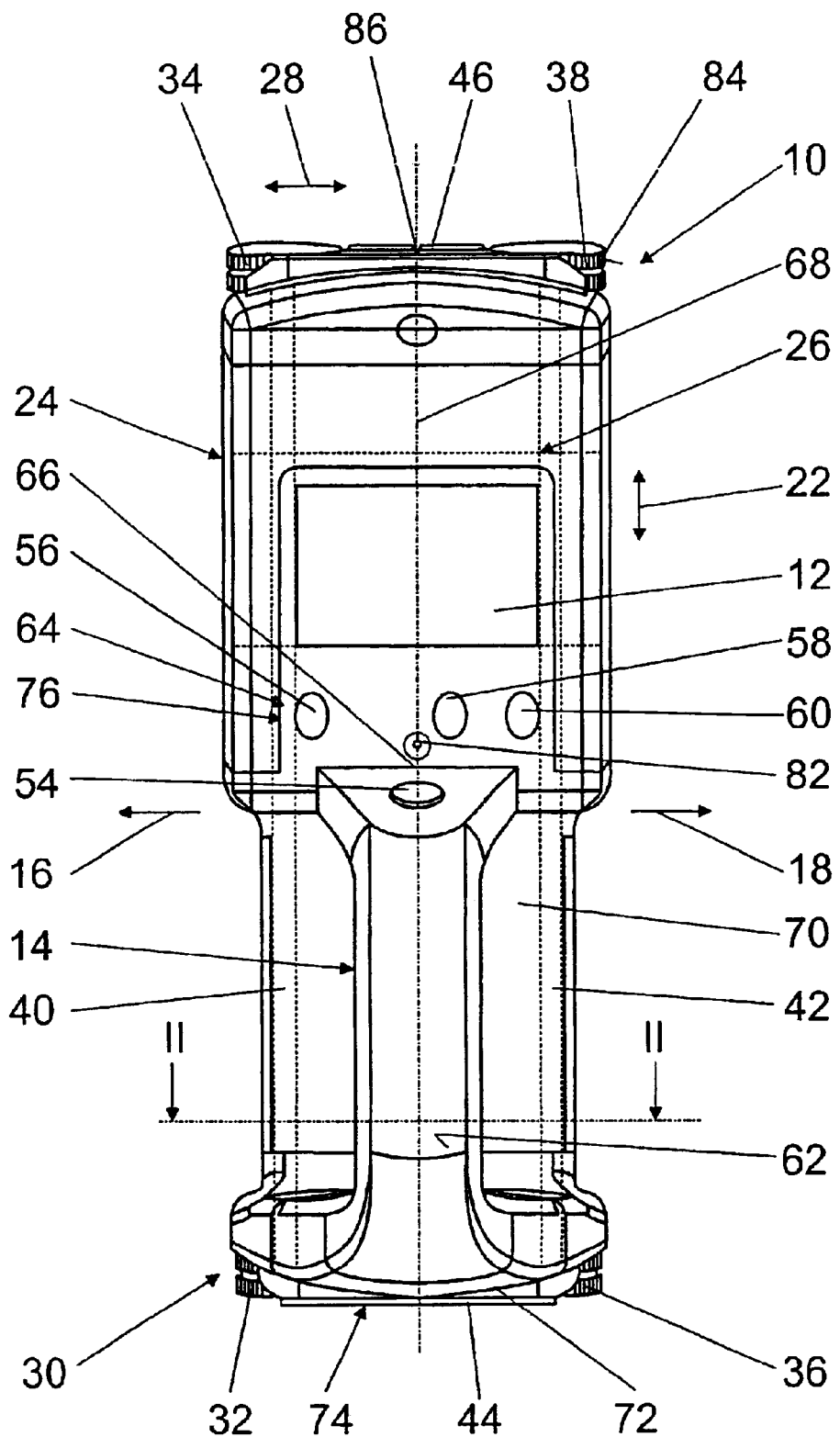
FIG. 1, a positioning device in a top view.

FIG. 1 shows a positioning device presented here, with a housing 10 and a chassis 30. The housing 10 of the positioning device is movable in two preferred, opposed motion measuring directions 16, 18, which extend perpendicular to a longitudinal direction 22 of the housing 10. On its top side 70, the housing 10 has a handle unit 14, formed by a hooplike grip, with a surface 62 to be grasped. The handle unit 14 extends in the longitudinal direction 22 of the housing 10 and is embodied symmetrically to a plane that is defined by a longitudinal center axis 68 and by a normal 82 to the top side 70 of the positioning device (FIG. 1).

Figure 2:
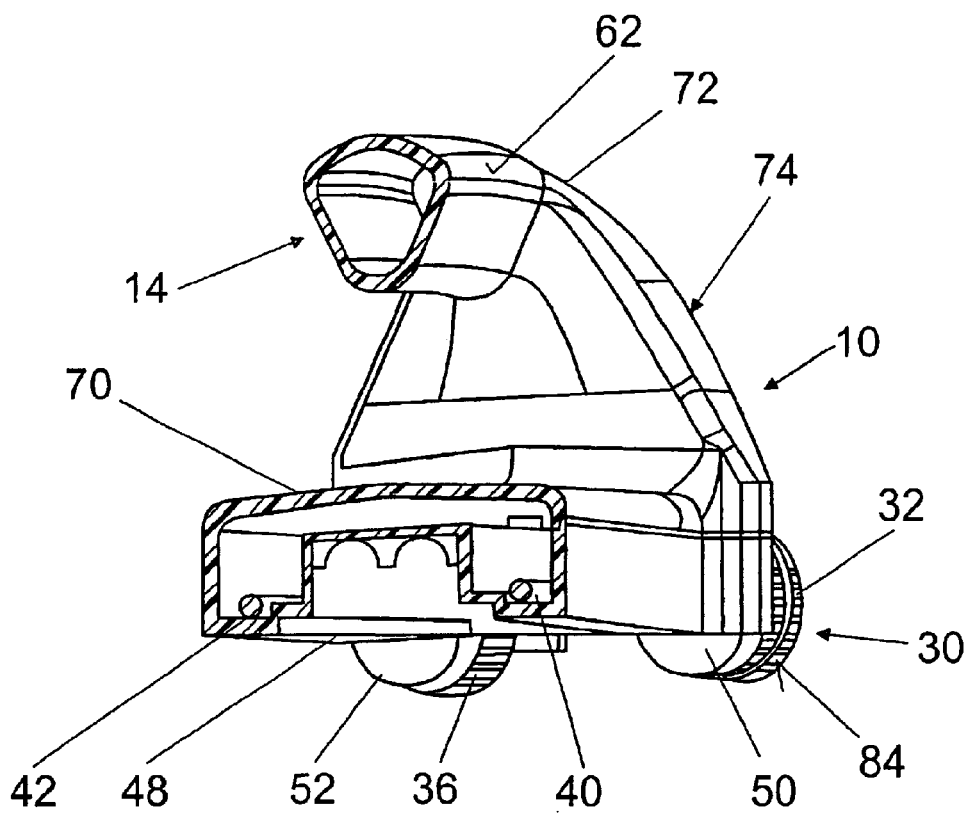
FIG. 2, a section taken along the line II—II in FIG. 1.

The handle unit 14 has a diamond-shaped cross-sectional area that narrows in the direction of the top side 70 and that with its first end 72, which points in the longitudinal direction 22 of the housing 10 toward an end region 74 of the housing 10, merges with the housing 10, while with its second end 66, the handle unit 14 opens out at the top side 70 of the housing 10 (FIGS. 1 and 2).

On its second end 66, the handle unit 14 has a first control element 54 (FIG. 1) in the longitudinal direction 22 in the direction of an LCD screen 12, following the surface 62 to be grasped. Following the handle unit 14, in the longitudinal direction 22 of the housing 10 in the direction of the LCD screen 12, which is a color screen, but can also be a monochromatic screen, there is a control field 76 with three control elements 56, 58, 60; the control elements 56, 58, 60 are disposed in a region 64 with a radius of approximately 25 mm from the end 66 of the handle unit 14. A user can guide the positioning device with one hand using the handle unit 14 and at the same time can operate the control elements 54, 56, 58 and 60 with his thumb.

The handle unit 14 protrudes past the top side 70 of the positioning device and forms a roll bar for protecting the LCD screen 12. In the longitudinal direction 22 of the housing 10, in an end region 24, below the LCD screen 12, the positioning device has a measurement unit 26; a transverse direction 28 of the housing 10 is essentially equivalent to a width of the measurement unit 26, specifically being approximately 100 mm (FIG. 1). The measurement unit 26 is embodied symmetrically to a plane that is defined by the longitudinal center axis 68 and by the normal 82 to the top side 72 of the positioning device.

The positioning device has four roller bodies 32, 34, 36, 38, embodied as wheels, which in the longitudinal direction 22 are disposed on opposite face ends 44, 46 in the transverse direction 28 in the outer region (FIG. 1). It is also conceivable to equip the positioning device with only three roller bodies; in that case, two roller bodies can be disposed on one face end, while a single roller body is disposed on an opposite face end. The various roller bodies 32, 34, 36, 38 opposite one another in the longitudinal direction 22 are connected to one another in a manner fixed against relative rotation via rigid axles 40, 42, and the rigid axles 40, 42 are passed through the measurement unit 26.

Figure 3:
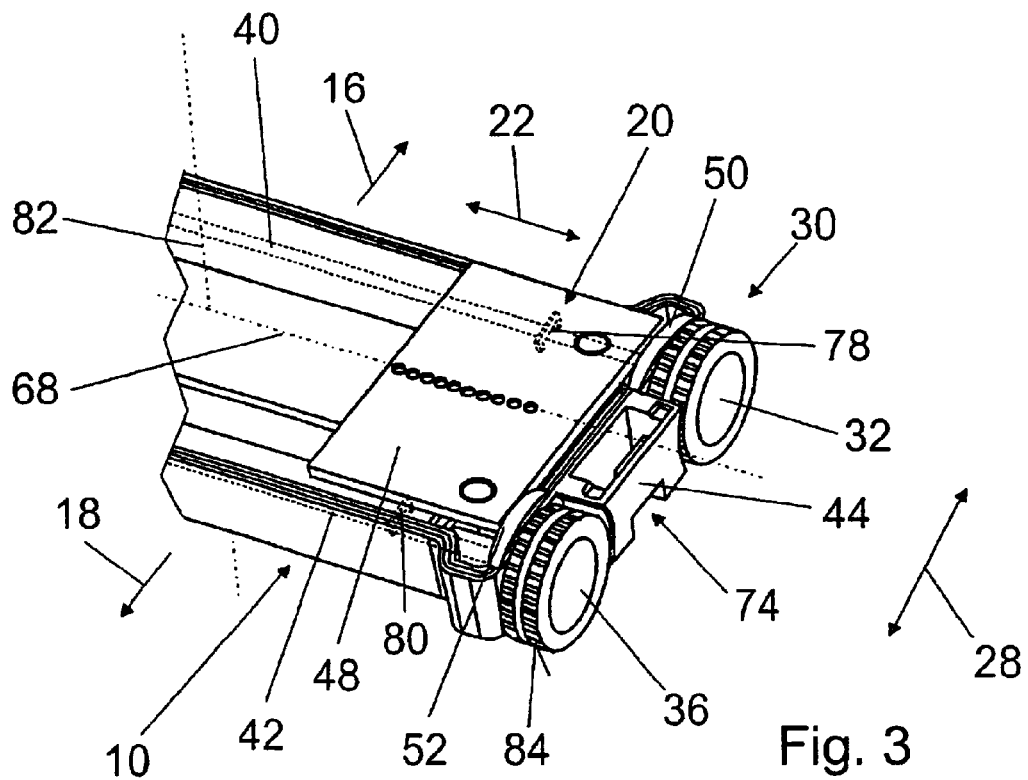
FIG. 3, a detail of an underside of the positioning device of FIG. 1.

On an underside 48 of the housing 10, for protecting the roller bodies 32, 34, 36, 38, protrusions 50, 52 are formed on; essentially, they take the form of a disklike segment of a circle (FIGS. 2 and 3).

For picking up motion parameters, the positioning device has a sensor unit 20 with two sensors 78, 80, with which a first and a second motion parameter can be detected (FIG. 3). The sensors 78, 80 of the sensor unit 20 are formed by optoelectronic components, or more specifically bifurcated light gates. For detecting the motion parameters, each sensor 78, 80 is coupled to a respective axle 40, 42 of the chassis 30, so that the first motion parameter can be detected via the first axle 40 and the second motion parameter can be detected via the second axle 42. The two axles 40, 42 are electronically coupled via the sensors 78, 80 of the sensor unit.

Segment wheels, not shown, are slipped onto the axles 40, 42 and move through the bifurcated light gates that form the sensors 78, 80. If per segment wheel, the sensors 78, 80 each have two light gates with a suitable offset from one another, then it is advantageously possible via a phase relationship of the two output signals to determine the motion measuring direction 16, 18 of the positioning device using the sensor unit 20.

If a user moves the housing 10 over the surface of an item to be examined, the roller bodies 32, 34, 36, 38 of the chassis 30 also roll with their surfaces 84 along the surface of the item being examined. With the roller bodies 32, 34, 36, 38, the axles 40, 42 are rotated, and with the axles 40, 42, the segment wheels are rotated.

The motion parameters, or the rotary speeds of the axles 40, 42, detected by the sensors 78, 80 are compared in an evaluation unit, not shown in detail, so that from the motion parameters, a conclusion can be drawn as to a parameter for a rotary motion of the housing 10 about an axis 82, which extends in the direction of the normal to the surface of the item being examined and furthermore forms the normal to the top side 70 of the positioning device.

If while the positioning device is being moved over a subject being examined, an object is displayed on the LCD screen 12, a notch 86 embodied on a face end 46 of the housing 10 indicates the position of the object in the item being examined, relative to the housing 10.

List of Reference Numerals

10 Housing
12 Display unit
14 Handle unit
16 Motion measuring direction
18 Motion measuring direction
20 Sensor unit
22 Longitudinal direction
24 End region
26 Measurement unit
28 Transverse direction
30 Chassis
32 Roller body
34 Roller body
36 Roller body 38 Roller body
40 Axle
42 Axle
44 Face end
46 Face end
48 Underside
50 Protrusion
52 Protrusion
54 Control element
56 Control element
58 Control element
60 Control element
62 Surface to be grasped
64 Region
66 End
68 Longitudinal center axis
70 Top side
72 End
74 End region
78 Sensor
80 Sensor
82 Axis
84 Face
86 Notch

What is claimed is:

1. A positioning device, comprising:
   a housing (10);
   a display unit (12) for graphic representation of measurement information, wherein said housing (10) is movable for locating purposes using a handle unit (14) over a surface of an article being examined;
   at least one sensor unit (20) for picking up a first motion parameter, wherein at least one motion measuring direction (16, 18) extends transversely to the longitudinal direction (22) of the housing (10), and
   wherein a measurement unit (26) for locating objects is embodied essentially symmetrically to a plane that is defined by a longitudinal center axis (68) and by a normal (82) to a top side (72).

2. The positioning device of claim 1, wherein at least one measurement unit (26) is disposed in the housing (10), in the longitudinal direction (22) of the housing (10) in an end region (24).

3. The positioning device of claim 2, wherein a transverse direction (28) of the housing (10) is determined essentially by a width of the measurement unit (26).

4. The positioning device of claim 3, wherein the maximum transverse direction (28) of the housing (10) is less than 12 cm.

5. The positioning device of claim 1, wherein a chassis (30) with at least one roller body (32, 34, 36, 38) is disposed on the housing (10), and its axle (40, 42) is passed into the measurement unit (26).

6. The positioning device of claim 5, wherein the axle (40, 42) is passed through the measurement unit (26), and the chassis (30) has at least two roller bodies (32, 34, 36, 38), that are joined to one another in a manner fixed against relative rotation via the axle (40, 42).

7. The positioning device of claim 6, wherein the roller bodies (32, 34, 36, 38) are disposed on opposed face ends (44, 46) of the housing (10).

8. The positioning device of claim 5, wherein at least one protrusion (50, 52) for protecting at least one roller body (32, 34, 36, 38) is disposed on an underside (48) of the housing (10).

9. The positioning device of claim 1, wherein at least two control elements (54, 56, 58, 60) are disposed on the housing (10) in front of and/or behind, in terms of the longitudinal direction (22) of the housing (10), a surface (62) to be grasped of the handle unit (14).

10. The positioning device of claim 9, wherein the control elements (54, 56, 58, 60), inside a front region (64) in terms of the longitudinal direction (22) of the housing (10), are disposed with a radius of 60 mm from a front end (66) of the handle unit (14).

11. The positioning device of claim 1, wherein the handle unit (14) is embodied symmetrically to a plane that is defined by a longitudinal center axis (68) and by a normal (82) to a top side (70).

12. The positioning device of claim 1, wherein the handle unit (14) has a cross-sectional area that tapers in the direction of a top side (70) of the housing (10).

13. The positioning device of claim 1, wherein with the sensor unit (20), in addition to the first motion parameter, at least one second motion parameter is detectable.

14. The positioning device of claim 13, wherein from the detected motion parameters, a parameter for a rotary motion of the housing (10) about at least one axis (82) can be ascertained.

15. A positioning device, comprising:
   a housing (10);
   a display unit (12) for graphic representation of measurement information, wherein said housing (10) is movable for locating purposes using handle unit (14) over a surface of an article being examined;
   at least one sensor unit (20) for picking up a first motion parameter, wherein at least one motion measuring direction extends transversely to the longitudinal direction (22) of the housing (10), and wherein a chassis (30) with at least one roller body (32, 34, 36, 38) is disposed on the housing (10), and wherein an axle of the at least one roller body (40, 42) is passed into a measurement device.

16. The positioning device of claim 15, wherein the axle (40, 42) is passed through the measurement unit (26), and the chassis (30) has at least two roller bodies (32, 34, 36, 38), that are joined to one another in a manner fixed against relative rotation via the axle (40, 42).

17. The positioning device of claim 15, wherein at least one protrusion (50, 52) for protecting at least one roller body (32, 34, 36, 38) is disposed on an underside (48) of the housing (10).

18. A positioning device, comprising:
   a housing (10);
   a display unit (12) for graphic representation of measurement information, wherein said housing (10) is movable for locating purposes using handle unit (14) over a surface of an article being examined;
   at least one sensor unit (20) for picking up a first motion parameter, wherein at least one motion measuring direction extends transversely to the longitudinal direction (22) of the housing (10), and wherein a chassis (30) with at least one roller body (32, 34, 36, 38) is disposed on the housing (10), and wherein an axle of the at least one roller body (40, 42) is passed into a measurement device, wherein the roller bodies (32, 34, 36, 38) are disposed on opposed face ends (44, 46) of the housing (10).

* * * * *